Sept. 11, 1962   J. P. TAILOR   3,052,990
METHOD AND APPARATUS FOR SOLIDS CONTACTING
Filed June 17, 1959   3 Sheets-Sheet 1

INVENTOR
JOHN P. TAILOR

BY Richard J. Wynne &
John A. Fincken
ATTORNEYS

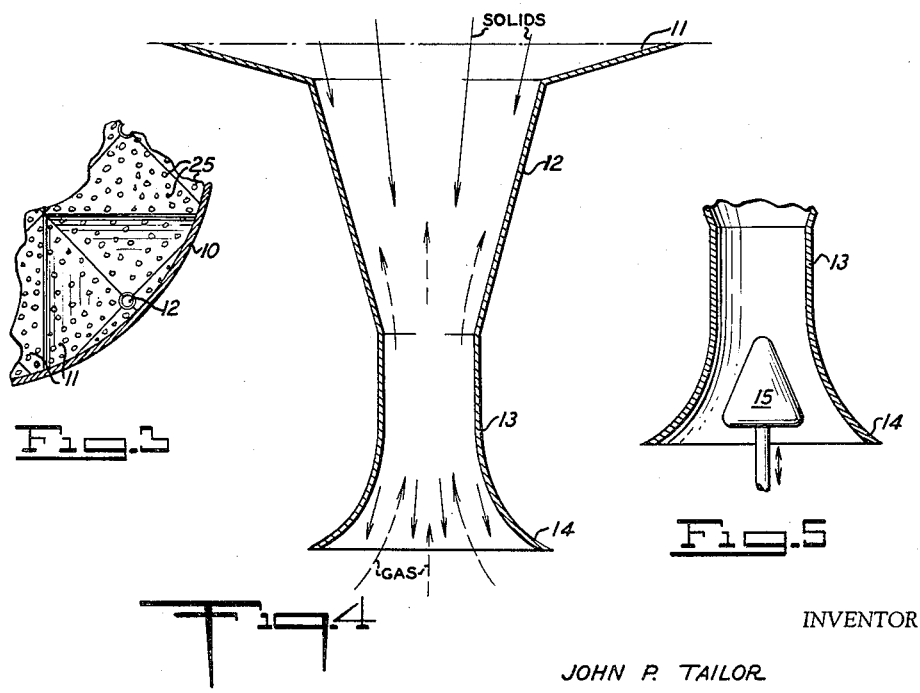

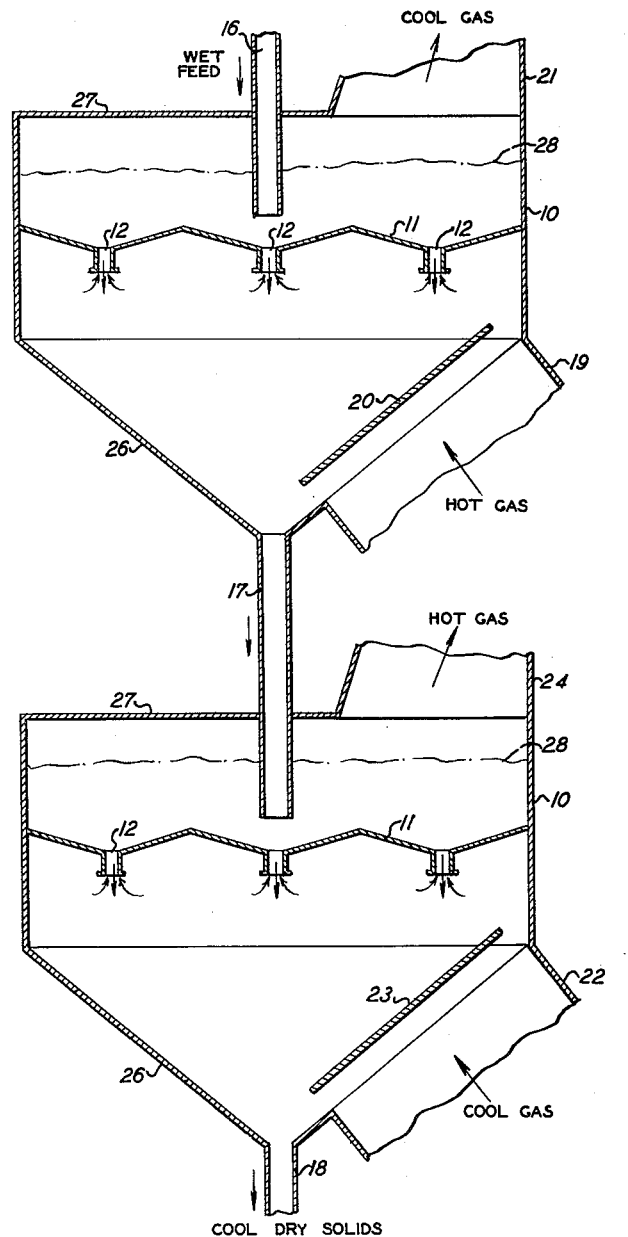

3,052,990
METHOD AND APPARATUS FOR
SOLIDS CONTACTING
John P. Tailor, 1840 W. 2nd St., Davenport, Iowa
Filed June 17, 1959, Ser. No. 820,896
4 Claims. (Cl. 34—57)

This invention relates to method and apparatus for contacting solids with gases and more particularly to effecting contact between a gas stream and relatively coarse solid material in countercurrent flow relationship. The invention finds particular utility in effecting heat transfer between solids and gases in the drying of particulate solids and in chemical reactions involving gases and particulate material.

It is among the objects of the present invention to provide methods and apparatus for effectively contacting solids with gases in countercurrent flow relationship.

A further object is to provide methods and apparatus for drying particulate solid material.

Another object is to provide methods and apparatus for effecting efficient heat transfer between gases and particulate material.

Other objects are to provide novel processes and apparatus for drying of coarse solid materials, including chemicals and foodstuffs, particularly where a long contact time is required to effect drying.

Further objects of the invention will be apparent to those skilled in the art.

The method of the present invention for contacting a gas with relatively coarse solids generally comprises maintaining a relatively deep bed of solids, withdrawing solids downwardly from the bottom of said bed through a throat, passing gas upwardly through said throat and through said bed, the velocity of said gas through said throat being sufficient to throttle the passage of solids therethrough but insufficient to prevent solids from falling therethrough by gravity, and the velocity of said gas through said bed being insufficient to entrain said solids.

The invention is also directed to such a method wherein said gas is additionally passed upwardly through said bed at a plurality of points spaced over said bed.

Additional embodiments include the use of such a method wherein the velocity of gas through said throat is in the range of 12 to 36 times the average velocity of gas through the bed.

Further methods embodied in the present invention include the method of drying as described above wherein the contacting gas is a dehydrating gas and the method of contacting involving the use of a plurality of vertically spaced beds wherein the gas contacts each bed in succession.

The apparatus of the present invention generally comprises a horizontally disposed plate having a funnel-shaped opening therein, said opening being larger than the particle size of the solids to be contacted, means for forcing gas upwardly through said funnel-shaped opening, means for maintaining a relatively deep bed of solids on said plate and means for collecting solids passing downwardly through said opening countercurrent to the gas flow therethrough.

Further embodiments include such apparatus wherein said plate has a plurality of additional openings therein, said additional openings being smaller than the particle size of the solids to be contacted; wherein means are included for varying the size of said funnel-shaped opening; and wherein the cross-sectional area of said plate served by the funnel-shaped opening is 12 to 36 times the cross-sectional area of the funnel-shaped opening.

A further embodiment of the apparatus comprises a vertically disposed conduit, a horizontally disposed plate in said conduit dividing said conduit into upper and lower sections, said plate having a funnel-shaped opening therein, said opening being larger than the particle size of the solids to be contacted, means for supplying a stream of gas to said lower section, means for supplying solids to said upper section for support on said plate, and means for collecting solids passing downwardly through said opening countercurrent to the gas flow therethrough.

Another embodiment comprises such an apparatus having a plurality of vertically spaced stage plates and means for contacting the solids successively on each plate with the gas.

The method of contact involved in the present invention differs from the well-known fluidized technique wherein a bed of particulate solids is maintained in a turbulent, boiling state on a perforated bed. In the fluidized solids technique, the perforations in the plate are smaller than the particle size of the solids material whereby solids do not pass through the perforations. In the method of the present invention, only a slow, mild circulation of solids takes place within the bed and in most cases the volume of the bed is expanded by the gas flow only to an amount of about 10 to 15%, as contrasted with the bed expansion of the order of several hundred percent in the fluidized solids technique. In addition, in the method of the present invention, the solids pass downwardly through the gas ports or funnel-shaped throats under the influence of gravity countercurrently to the gas flow.

Referring now to the drawings,

FIGURE 2 is a view looking from the top of a stage plate 11 shown in FIGURE 1.

FIGURE 3 is a partial view of an alternative form of stage plate shown in FIGURE 2.

FIGURE 4 is a view on a large scale of the funnel-shaped throat sections of the stage plates shown in FIGURES 1, 2 and 3.

FIGURE 5 is a cross-sectional view of an alternative form of funnel-shaped throat section.

FIGURE 6 is a cross-sectional view in elevation of a dryer and cooler embodying the present invention.

Figure 1:
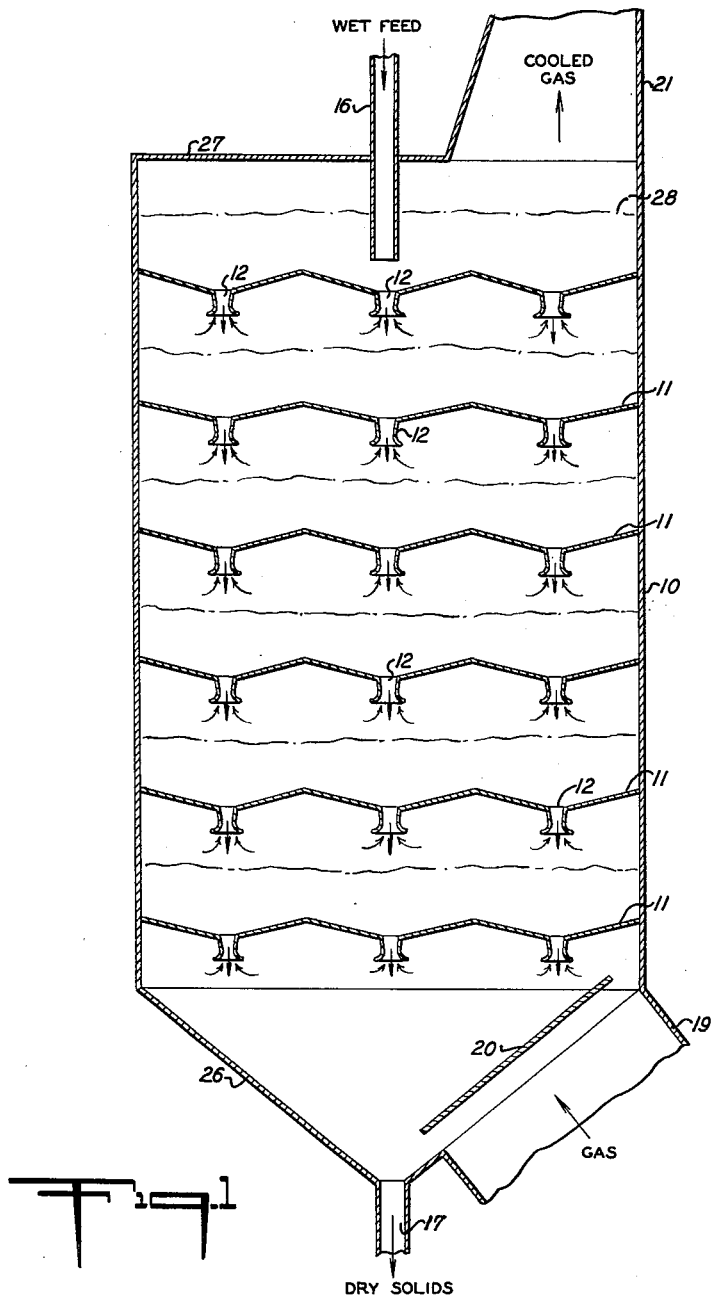
FIGURE 1 is a cross-sectional view in elevation of a multi-stage contact apparatus embodying the invention.

Character 10 designates a casing or conduit which, as in FIGURE 1, carries a plurality of vertically spaced, generally horizontally disposed stage plates 11. Each stage plate 11 has a plurality of funnel-shaped openings or throat sections 12 therein. As is shown on FIGURE 4, the throat section 12 preferably narrows to a constricted section 13 and has an outwardly flaring mouth 14. The casing 10 is provided with a feed pipe 16 for solid materials, an imperforate top 27 and a gas exit conduit 21. The bottom of the casing 10 is preferably hopper-shaped as shown at 26 which feeds into a conduit 17 for removal of solid material. A gas inlet conduit 19 is provided in the bottom 26 and a baffle 20 is also provided to prevent solids from entering the gas conduit 19.

As shown on FIGURE 4, the solids carried on the stage plate 11 pass downwardly through the throat section 12, 13, 14, and the gas passes upwardly therethrough countercurrent to the gas flow. An alternative embodiment of the throat sections is shown in FIGURE 5 wherein a plug 15 is movably mounted in the throat. Upward or downward movement of the plug 15 will diminish or augment respectively the effective cross-sectional area of the throat, thereby enabling the control of gas flow and solids flow through the throat. As shown in FIGURE 3, in a further embodiment, the stage plate 11 is additionally provided with a plurality of openings 25, which are preferably uniformly spaced. These openings 25 are relatively smaller than the particle size of the solids to be contacted whereby no solids pass through the openings 25. This embodiment is utilized where it is desirable to maintain a higher rate of gas flow through the bed of solids without diminishing the rate of flow of solids through the throat 12.

In the throat section 12, 13, 14, the particulate solids are subjected to an intense gas-solids relative velocity. Highly efficient heat transfer is thus effected between the gas and solids. The throat acts like a valve to restrict the flow of solids therethrough. Counteracting the sustaining effect of the throat is the head of solids above the plate 11. The resultant contact of gas and solids on the plate 11 and in the throat is highly efficient for drying of heat-sensitive materials, for example.

A wide range of solids particle sizes may be contacted in accordance with the invention. Particle sizes from large grains down to 20 mesh have been contacted in drying operations. The relation between gas velocity through the throat to the average velocity throughout the bed should be in the ratio of about 12 to 1 to 36 to 1. Thus, for contacting grain, a throat diameter at 13 of about 5 inches has been found highly efficient for an effective cross-sectional area of solids carried on the plate 11 of about 3.14 square feet, corresponding to a diameter of two feet. The velocity ratio (at standard temperature and pressure) for contacting apparatus of these dimensions is 23 to 1.

In operation, referring to FIGURE 1, solids to be contacted are fed at 16 while gas from a blower or the like is introduced at 19. The solids will build up on each stage plate to a level generally indicated by 28. Solids are removed at 17 and the exit gas is removed at 21. The multi-stage contacting apparatus illustrated by FIGURE 1 is particularly adapted for relatively fine materials, i.e. about 10–20 mesh. For contacting relatively coarser materials such as grain, single stage apparatus, such as that shown in FIGURE 6 is preferred.

FIGURE 6 illustrates a contacting apparatus comprising two vessels 10, each having a single stage plate 11. The vessels 10 are provided with imperforate top sections 27 and hopper-like bottom sections 26. This apparatus is particularly adapted for drying and cooling coarse material such as grain. Wet solids are fed at 16 and build up on the stage plate 11 to a depth as indicated at 28. Hot dry gas is admitted at 19 from a blower and the cooled gas bearing moisture is removed at 21. The hot dry solids empty into the cooler by conduit 17 where they are contacted with cool dry gas. The solid material here maintains a depth as indicated by 28. Cool gas is admitted at 22 from a blower and hot gas is exited at 24. Cool dry solids are removed through conduit 18.

In a particular embodiment of the apparatus shown in FIGURE 6, a drying section and a cooling section were provided, each having a cross-sectional area for the stage plate 11 of 28 square feet. Each stage plate had 9 uniformly spaced throats 12 therein. Each throat therefore served a cross-sectional area of bed corresponding to a diameter of two feet. Each throat was 9 inches in diameter at the mouth adjacent the plate 11 and was five inches in diameter at its narrowest point 13. Wet wheat bran was fed to the drying section to conduit 16 at the rate of 21,820 lbs. per hour (794 lbs. per hour per square foot of stage plate area). Hot air at 250° F. was delivered through conduit 19 at the rate of 22,500 standard cubic feet per minute (2500 s.c.f.m. per throat). The cooled wet gas at about 70° F. was removed at 21.

The hot dried bran was removed from the dryer section through conduit 17 and fed to the cooler which was of identical construction to the dryer. Cool dry air (50° F.) was delivered at the rate of 22,500 s.c.f.m. through conduit 22. Cool dry grain was removed at 18. The warm gas exiting from the conduit 24 may be fed directly to the inlet 19 if desired for heat economy reasons or the feed gas at 19 may be supplemented with additional preheated air. The bran under these conditions maintained a depth of about 4 feet on each stage plate 11. The dry cool bran recovered amounted to 19,600 lbs. per hour. The amount of water evaporated was 2,220 lbs. per hour.

The process and apparatus of the invention is particularly suited for the drying of heat-sensitive materials, such as organic materials, foodstuffs and the like. It is also particularly suited for the drying of materials which require a long time to give up their moisture, i.e. where the diffusion of water to the surface of the particle is slow. If further residence time or contact with more gas in a dryer is desired, the embodiments shown in FIGURES 3 and 5 may be utilized. The perforated stage plate of FIGURE 3 permits higher rates of gas flow through the bed without slowing the rate of solids throughput. The use of the variably positioned plugs 15 of FIGURE 5 in each of the throats permits variation in residence time in the dryer.

The invention also finds utility in the transfer of heat between solids and gases, such as heating or cooling of the solids. Examples are in the cooling of grain or foodstuffs, calcination at high temperatures of limestone, soda ash, Portland cement and other inorganic solids.

While the invention has been described in terms of certain examples, such examples are to be considered illustrative rather than limiting and it is intended to cover such further modifications apparent to those skilled in the art which fall within the spirit and scope of the appended claims.

I claim:

1. Apparatus for contacting relatively coarse solids with a gas comprising a vertically disposed conduit, a horizontally disposed stage plate dividing said conduit into upper and lower chambers and having a top surface providing a support for a bed of said solids, said stage plate having a plurality of uniformly spaced funnel-shaped openings extending downwardly from the top surface therethrough, said stage plate having a plurality of uniformly spaced perforations extending therethrough in the areas surrounding said openings, means for admitting solids to said upper chamber, means for admitting gas under pressure to said lower chamber, means for discharging gas from said upper chamber, and means for discharging solids from said lower chamber, said funnel-shaped openings being larger than the particle size of the solids to be contacted to provide for countercurrent flow of solids and gas therethrough and said perforations being smaller than the particle size of the solids to be contacted to provide for gas flow upwardly therethrough without downward solids flow therethrough to expand the bed of solids on said stage plate.

2. Apparatus set forth in claim 1 wherein said conduit is provided with a plurality of said stage plates, said stage plates being vertically spaced apart to divide said conduit into an upper chamber, a plurality of intermediate chambers, and a lower chamber.

3. Apparatus set forth in claim 1 including means for varying the size of said funnel-shaped openings.

4. Apparatus set forth in claim 1 wherein the area of the surface of said stage plate is 12 to 36 times the combined areas of said funnel-shaped openings.

References Cited in the file of this patent

UNITED STATES PATENTS

| | | |
|---|---|---|
| 2,433,726 | Angell | Dec. 30, 1947 |
| 2,471,084 | Wilcox et al. | May 24, 1949 |
| 2,509,751 | Watson | May 30, 1950 |
| 2,523,126 | Long | Sept. 19, 1950 |
| 2,561,394 | Marshall | July 24, 1951 |
| 2,568,749 | Kittel | Sept. 25, 1951 |
| 2,621,113 | Alther | Dec. 9, 1952 |
| 2,671,102 | Jewell | Mar. 2, 1954 |
| 2,866,625 | Sylvest | Dec. 30, 1958 |

FOREIGN PATENTS

| | | |
|---|---|---|
| 1,008,715 | Germany | May 23, 1957 |